United States Patent
Luccin et al.

(10) Patent No.: US 10,325,414 B2
(45) Date of Patent: Jun. 18, 2019

(54) APPLICATION OF EDGE EFFECTS TO 3D VIRTUAL OBJECTS

(71) Applicant: Microsoft Technology Licensing, LLC, Redmond, WA (US)

(72) Inventors: Karim Audrey Luccin, Redmond, WA (US); Jonathan Gustav Paulovich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 15/589,597

(22) Filed: May 8, 2017

(65) Prior Publication Data

US 2018/0322708 A1    Nov. 8, 2018

(51) Int. Cl.

| | |
|---|---|
| *G06T 19/20* | (2011.01) |
| *G06T 15/20* | (2011.01) |
| *G06T 15/30* | (2011.01) |
| *G06T 15/00* | (2011.01) |
| *G06T 17/00* | (2006.01) |
| *G02B 27/01* | (2006.01) |
| *H04N 13/207* | (2018.01) |
| *H04N 13/271* | (2018.01) |
| *H04N 13/344* | (2018.01) |
| *G06T 17/20* | (2006.01) |
| *G06T 17/05* | (2011.01) |

(52) U.S. Cl.
CPC .......... *G06T 19/20* (2013.01); *G02B 27/0172* (2013.01); *G02B 27/0176* (2013.01); *G06T 15/005* (2013.01); *G06T 15/20* (2013.01); *G06T 15/205* (2013.01); *G06T 15/30* (2013.01); *G06T 17/05* (2013.01); *G06T 17/20* (2013.01); *H04N 13/207* (2018.05); *H04N 13/271* (2018.05); *H04N 13/344* (2018.05); *G02B 2027/014* (2013.01); *G02B 2027/0141* (2013.01); *G02B 2027/0161* (2013.01); *G06T 2210/12* (2013.01); *G06T 2219/20* (2013.01); *G06T 2219/2021* (2013.01); *H04N 2213/008* (2013.01)

(58) Field of Classification Search
None
See application file for complete search history.

(56) References Cited

U.S. PATENT DOCUMENTS

| 8,315,791 B2 | 11/2012 | Bales et al. |
| 8,625,183 B2 | 1/2014 | Khan |
| (Continued) | | |

OTHER PUBLICATIONS

Felix Wimmer, Focus and Context Visualization for Medical Augmented Reality, 2007, Computer Science Thesis, Technical University of Munich, Munich, Germany.*

(Continued)

*Primary Examiner* — Michael J Cobb
(74) *Attorney, Agent, or Firm* — Arent Fox LLP

(57) ABSTRACT

To apply an edge effect to a 3D virtual object, a display system receives user input indicative of a desired display region of a 3D virtual object, defines a bounding volume corresponding to the desired display region, and clips the edges of the 3D virtual object to the surfaces of the bounding volume. The display system applies a visual edge effect to one or more of the clipped edges of the 3D virtual object, and displays to the user of the 3D virtual object with the visual edge effect. The technique can include selectively discarding pixels along a surface of the bounding volume, based on a depth map indicative of height values of the 3D virtual object at different horizontal pixel coordinates where the visual edge effect is applied only for edge pixels not discarded.

17 Claims, 10 Drawing Sheets

(56) References Cited

U.S. PATENT DOCUMENTS

| | | | | |
|---|---|---|---|---|
| 2007/0139416 | A1* | 6/2007 | Azuma | A63F 13/10 345/473 |
| 2010/0110069 | A1 | 5/2010 | Yuan | |
| 2012/0206452 | A1 | 8/2012 | Geisner et al. | |
| 2013/0222384 | A1 | 8/2013 | Futterer | |
| 2013/0321400 | A1 | 12/2013 | van os et al. | |
| 2014/0002444 | A1* | 1/2014 | Bennett | G06F 3/012 345/419 |
| 2014/0146394 | A1* | 5/2014 | Tout | G09B 9/307 359/630 |
| 2014/0306993 | A1 | 10/2014 | Poulos et al. | |
| 2015/0015611 | A1 | 1/2015 | Meier et al. | |
| 2015/0304645 | A1 | 10/2015 | Wilson et al. | |
| 2017/0236260 | A1* | 8/2017 | Budagavi | G06T 5/50 382/275 |
| 2017/0236320 | A1* | 8/2017 | Gribetz | G06T 19/00 345/419 |
| 2017/0237789 | A1* | 8/2017 | Harner | G06F 3/011 709/205 |
| 2017/0243319 | A1* | 8/2017 | Wittenbrink | G06F 9/451 |
| 2018/0178124 | A1* | 6/2018 | Noda | A63F 13/5255 |
| 2018/0190006 | A1* | 7/2018 | Overbeck | G06T 15/06 |

OTHER PUBLICATIONS

Wilmot W. Li, Interactive Illustrations for Visualizing Complex 3D Objects, 2008, Dissertation, University of Washington, Seattle, WA, USA.*

Wilmot Li, Lincoln Ritter, Maneesh Agrawala, Brian Curless, David Salesin, Interactive Cutaway Illustrations of Complex 3D Models, 2007, ACM Transactions on Graphics, 26(3):31-1-31-11.*

Stefanie Zollmann, Visualization in Outdoor Augmented Reality, 2013, Dissertation, Graz University of Technology, Graz, Austria.*

Stevenf, "Topic: Build Depth Maps Without Creating Dense Cloud? (Read 1062 times)", http://www.agisoft.com/forum/index.php?topic=3096.0, Nov. 18, 2014, 2 pages.

"Tutorial 24: Clipping Planes", http://www.rastertek.com/dx11tut24.html, 2008, 12 pages.

"Mobile Map Tools on Google Glasses: Welcome to the augmented reality world in wearable devices with mobile map tools", http://glasses.mobilemaptools.com/, 2014, 9 pages.

"Semantics", https://msdn.microsoft.com/en-us/library/windows/desktop/bb509647(v=vs.85).aspx, Oct. 15, 2011, 9 pages.

Goulas, et al., "3D Mapping from High Resolution Satellite Images", In Proceedings of 1st International Remote Sensing and Geoinformation Conference, Aug. 5, 2013, 25 pages.

Puiu, Tibi, "New interactive military holographic 3D map by DARPA", http://www.zmescience.com/research/new-interactive-military-holographic-3d-map-by-darpa-3214344/, Mar. 29, 2011, 4 pages.

Rosenberg, Adam, "God mode in Minecraft", http://mashable.com/2015/06/18/hololens-minecraft-e3-2015/#Sn7_y6nG8GqW, Jun. 18, 2015, 10 pages.

"International Search Report and Written Opinion in PCT Application No. PCT/US18/028712", dated Jul. 3, 2018, 10 Pages.

* cited by examiner

APPLICATION OF EDGE EFFECTS TO 3D VIRTUAL OBJECTS

BACKGROUND

Virtual reality (VR) and augmented reality (AR) visualization systems have entered the mainstream consumer electronics marketplace. Near-to-eye display (NED) devices, such as head-mounted display (HMD) devices, can be used to display AR or VR content to users. AR devices may include transparent display elements that enable a user to see virtual content transposed over the user's view of the real world. Displayed objects that appear to be superimposed over the user's real-world view are commonly referred to as virtual objects or "holographic" objects. VR and AR visualization systems can provide users with entertaining, immersive three-dimensional (3D) virtual environments in which they can visually (and sometimes audibly) experience things they might not normally experience in real life.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
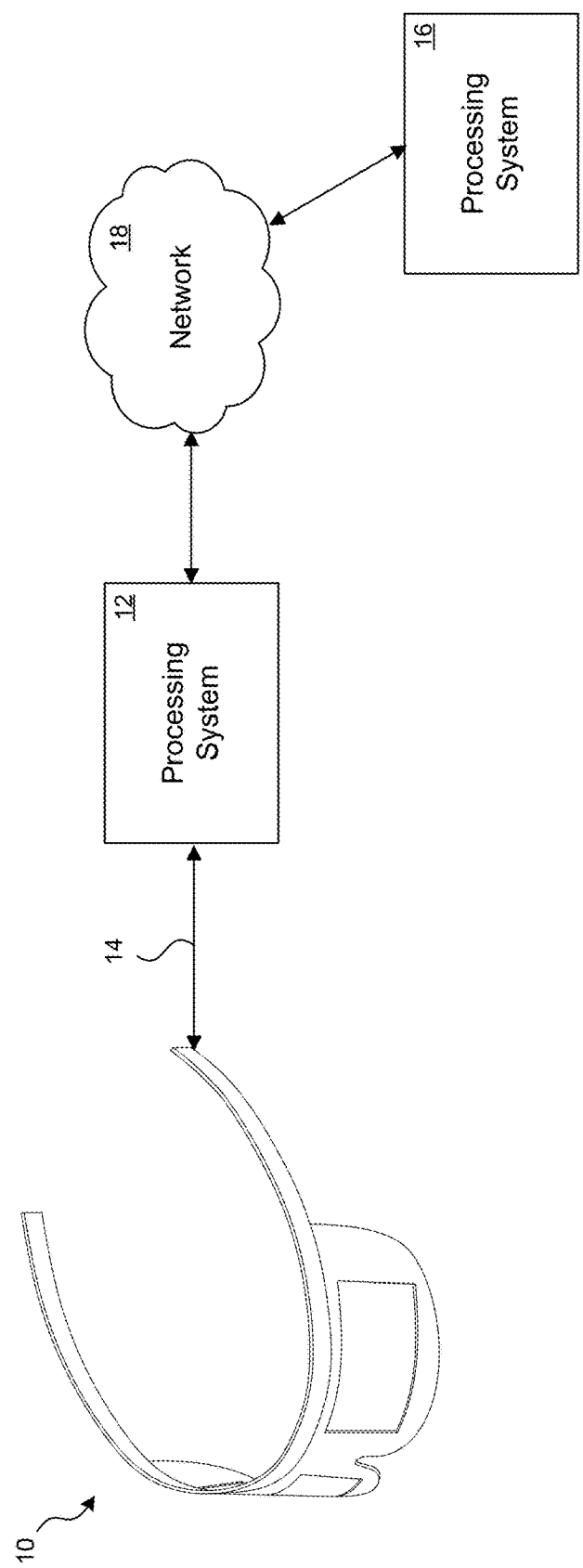
FIG. 1 shows an example of an environment in which a virtual reality (VR) or augmented reality (AR) enabled HMD device can be used.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

When displaying a 3D virtual object, such as a terrain map, it may be desirable to limit the visible area so that the user can interact with it more easily. Clipping the object to a box-shaped volume is a good way of achieving that result, but the clipped geometry needs to be filled somehow to avoid an unpleasant visual effect. A solution that is inexpensive in terms of use of processing resources is desirable, especially for a mobile device such as an HMD.

Various solutions are possible, but many are less than optimal. One possible solution is to use a geometry buffer that generates the edge geometry in real time. However, geometry shaders tend to be more expensive on a mobile device in terms of resource usage and are difficult to correctly implement. Alternatively the geometry can be generated entirely on the CPU. This approach may be easier to implement in software, however, it would be much slower and would be constrained by the number of processing cores available, which on a mobile device tends to be a small number.

This solution introduced here has the advantage of being easy to implement and very inexpensive to render. It tends to consume very little power on a mobile device (e.g., an HMD), as it has a fixed pixel cost on a graphics processing unit (GPU) and a one-time generation cost when loading a tile for the first time. The solution can be, but is not necessarily, implemented in a mobile display system such as an HMD designed for AR visualization.

In certain embodiments the solution introduced here includes loading, into a working memory of the display system, data representing at least a portion of a 3D virtual object. The display system then receives, from a user, first user input indicative of a desired display region of the 3D virtual object. The display system defines a bounding volume (e.g., a cube) corresponding to the desired display region, based on the first user input, and clips the edges of the 3D virtual object to the surfaces of the bounding volume. The display system then applies a visual edge effect to one or more of the clipped edges of the 3D virtual object, and displays to the user of the 3D virtual object with the visual edge effect.

The clipping involves selectively discarding pixels along a surface of the bounding volume, based on a depth map indicative of height values of the 3D virtual object at different horizontal pixel coordinates. The visual edge effect is applied only for edge pixels not discarded. The depth map can be generated by positioning a virtual camera above each of the horizontal pixel coordinates of the 3D virtual object, and then performing a single-frame render based on the virtual camera, by calculating, at each horizontal pixel location of the object, a vertical distance from the virtual camera to the topmost pixel of the 3D virtual object. For each depth value the virtual camera is positioned along the "up" vector of the 3D virtual object and is oriented or rotated to face in the negative (down) direction along the "up" vector. In this description, the term "horizontal" means perpendicular to the "up" vector of the 3D virtual object and "vertical" means parallel to the "up" vector of the 3D virtual object. Note also that while this disclosure describes generation of the depth map as a real-time operation relative to displaying the object to a user, in other embodiments the depth map could instead be generated offline, prior to use of the device.

The process is repeated as necessary in real time in response to user inputs. Hence, if the user moves or otherwise changes the region of the object that he or she wishes to see, the desired display region and edge effects will be modified nearly instantaneously to reflect that change.

In certain embodiments, only the defining of the bounding volume is performed by the CPU of the display system, and all other steps of the method are performed by the GPU. Further, the method can be performed entirely without use of a geometry shader, which would be computationally expensive.

Before further discussing the technique introduced here, it is useful to consider examples of an environment and a device in which the technique can be implemented. As shown in FIG. 1, an HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
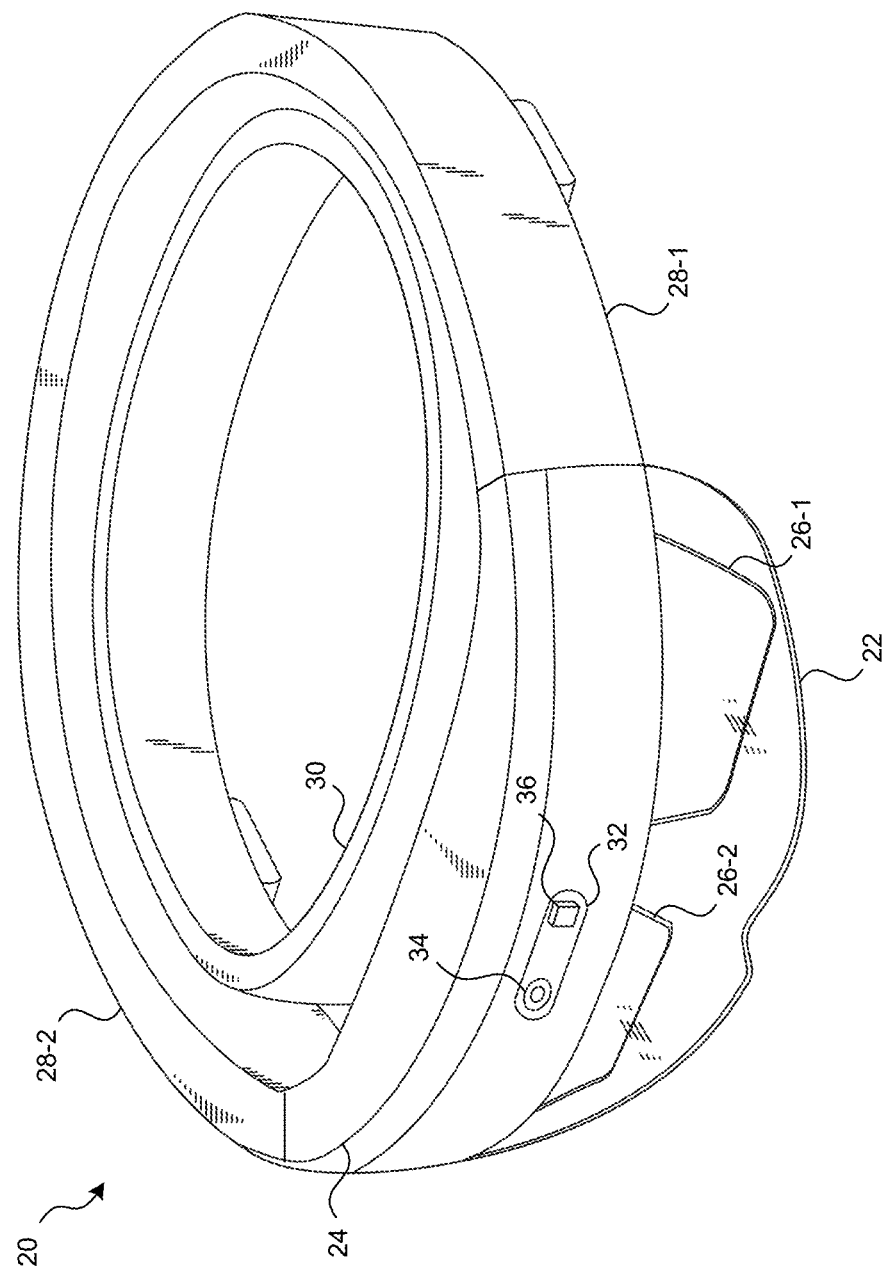
FIG. 2 illustrates a perspective view of an example of an AR-enabled HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which an illumination-and-sensor module 32 and other components can be attached. In some embodiments the illumination-and-sensor module 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The illumination-and-sensor module 32 includes a depth camera 34 and an illumination module 36 of a depth imaging system. The illumination module 36 emits light to illuminate a scene. Some of the light reflects off surfaces of objects in the scene, and returns back to the imaging camera 34. In some embodiments, the illumination modules 36 and the depth cameras 34 can be separate units that are connected by a flexible printed circuit or other data communication interfaces. The depth camera 34 captures the reflected light that includes at least a portion of the light from the illumination module 36.

The HMD device 20 includes electronics circuitry (not shown in FIG. 2) to control the operations of the depth camera 34 and the illumination module 36, visible light capture & processing, and to perform associated data processing functions. The circuitry may include, for example, one or more processors and one or more memories. As a result, the HMD device 20 can provide surface reconstruction to model the user's environment, or can be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

An HMD device, such as HMD device 20, or other type of display system can implement the technique introduced here of applying edge effects to 3D virtual ("holographic") objects. The technique is now further described in relation to FIGS. 3 through 12. One example of a 3D virtual object that a user of an HMD device may wish to view is a 3D terrain map or other image of a geographic area. While a 3D terrain map is used herein as an example to facilitate description, it will be recognized that the technique introduced here can be applied to many other types of 3D virtual objects, particularly in instances where the size of the object is greater than the currently selected display region at the currently selected scale of display.

Figure 3:
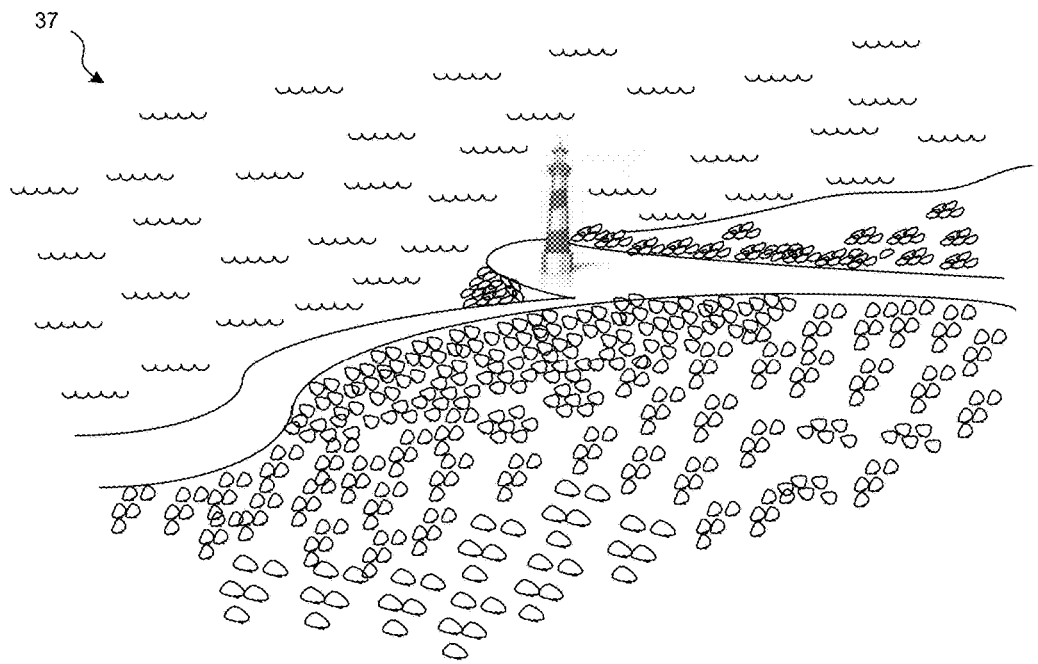
FIG. 3 shows an example of a 3D virtual object that a user of an HMD device or other type of display system can view with the HMD device.
Figure 4:
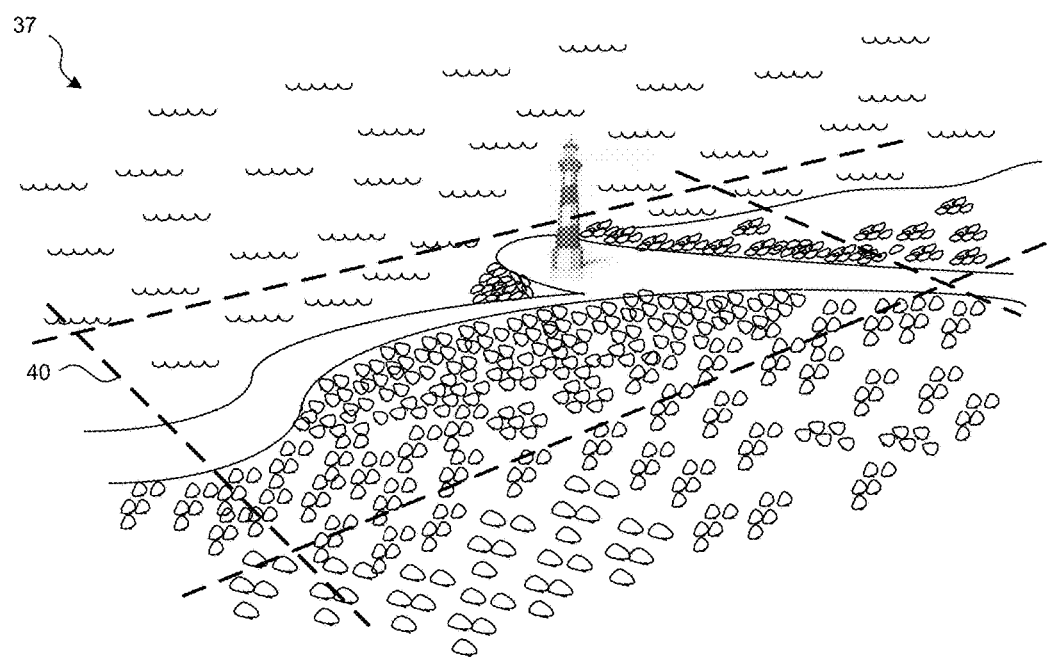
FIG. 4 shows in perspective view how the boundaries of a particular tile may be defined relative to a larger portion of the image.

FIG. 3 shows an example of a 3D virtual object that a user of an AR-enabled HMD device or other type of display system can view with the device. Specifically, the 3D virtual object 37 in FIG. 3 is a simplified example of a 3D terrain image (e.g., a map) of a geographic area. In this example, the image is a perspective view of a lighthouse located on a rocky shoreline next to an ocean and a road. The image in its entirety may be extremely large (much larger than the simplified example in FIG. 3), and may include images of the geographic area at multiple different scales. Accordingly, the image of the object 37 at some or all of the scales may be stored in memory as a number of contiguous segments, called "tiles" (e.g., square tiles), so that the entire image does not have to be loaded into working memory (e.g., random access memory (RAM)) if the user only wants to view a selected portion of the image (e.g., a selected portion of a geographic area in a 3D map). That is, only the tile or tiles relevant to the currently selected display region need to be loaded into working memory at any given time. Each tile is loaded/unloaded on demand and matches a certain area of the object defined in a horizontal plane (and includes all vertical locations of the object within that area). There may be multiple sets of tiles for the object, where each set of tiles corresponds to a different zoom level (scale) and has a different level of detail than the other sets of tiles. FIG. 4 shows (in perspective view) how the boundaries of a particular tile 40 may be defined relative to a larger portion of the image.

Figure 5:
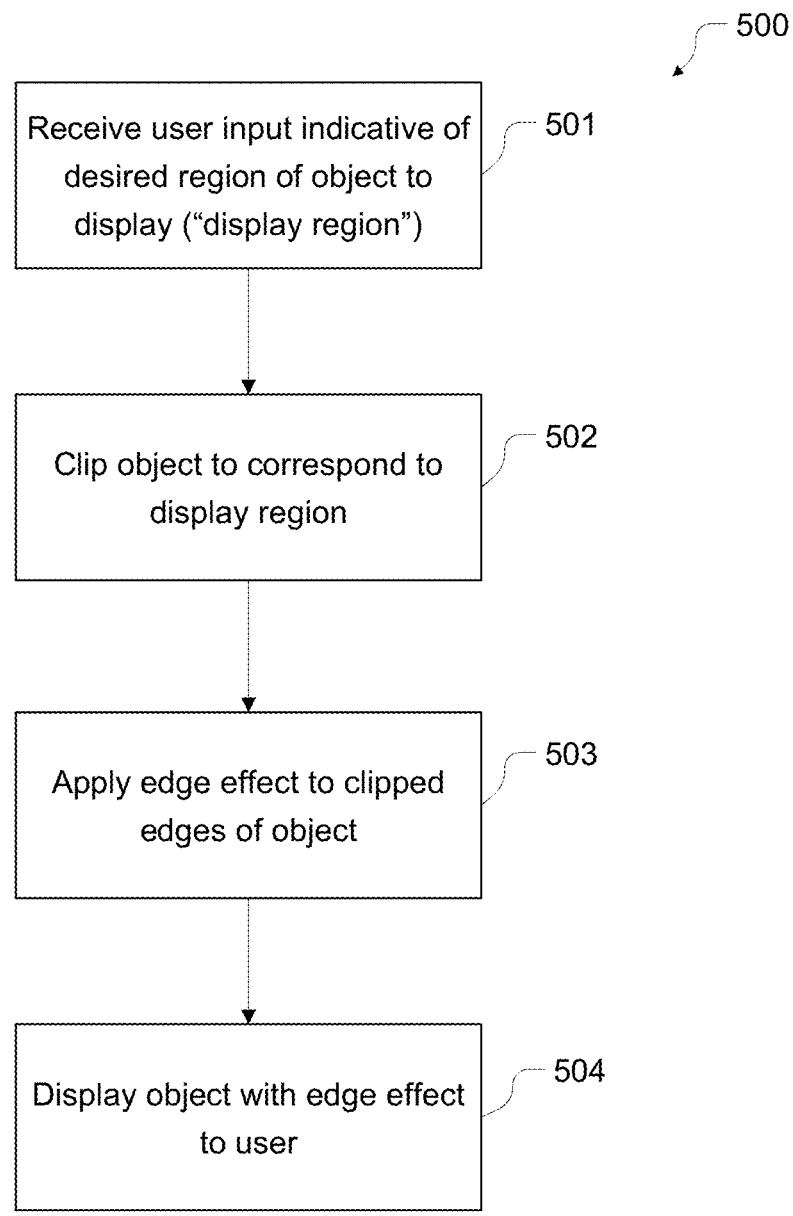
FIG. 5 is a flow diagram showing an example of an overall process that a display system can perform according to the technique introduced here.

FIG. 5 shows an example of an overall process 500 that a display system (e.g., an HMD device) can perform according to the technique introduced here. Initially, at step 501 the display system receives user input indicative of a desired region to display of a 3D virtual object ("display region"). At step 502 the display system clips the object to correspond to the display region. The display system then applies an edge effect to the clipped edges of the object at step 503. At step 504 the display system displays the object with the applied edge effect to the user. Note that the user does not perceive step 503 as being performed separately from step 504, since the steps are performed at the speed of a microprocessor.

Figure 12:
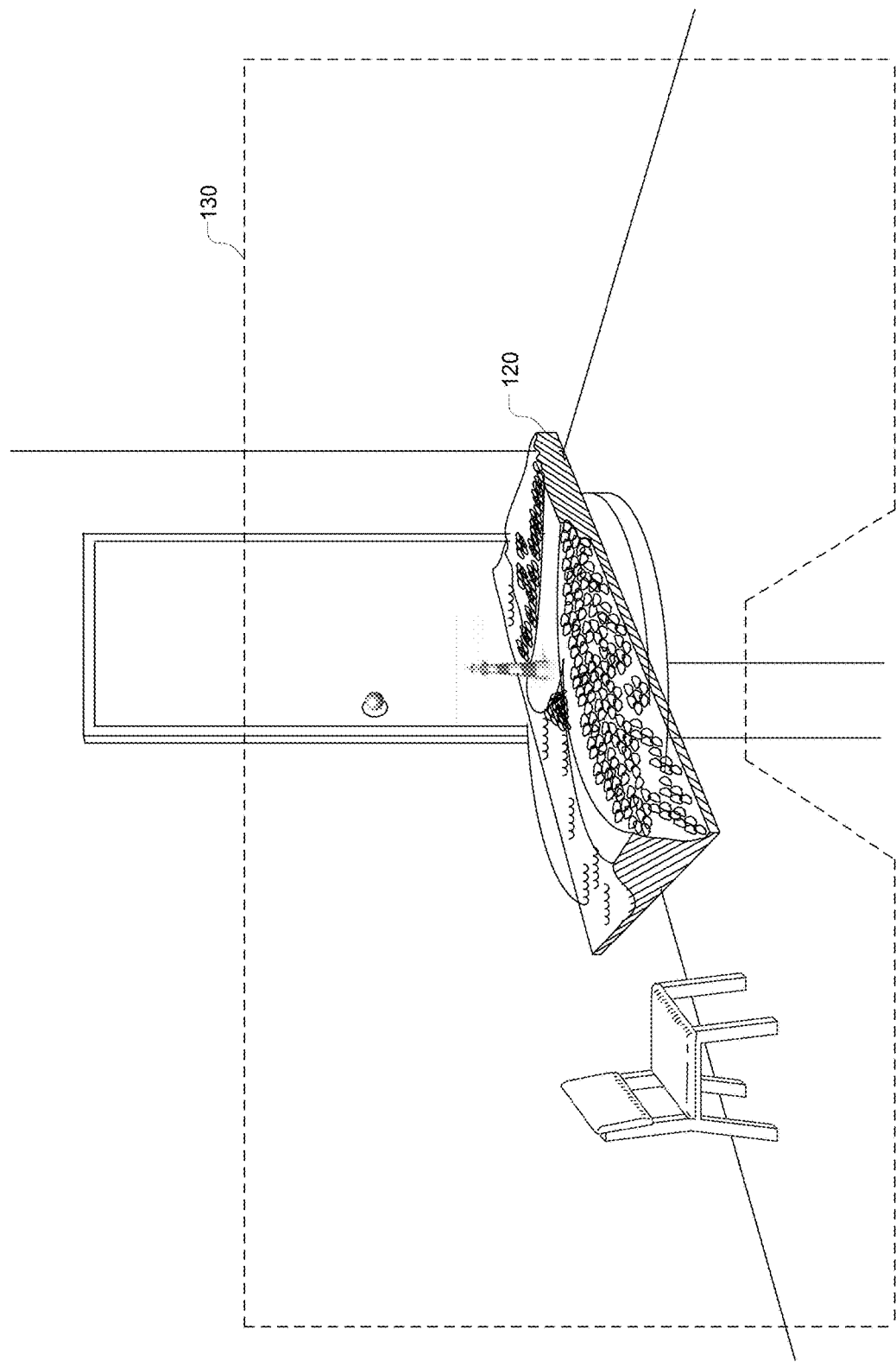
FIG. 12 shows an example of how the 3D virtual object of FIG. 3 might appear to the user of an AR-enabled HMD device after application of the technique in FIG. 5.

FIG. 12 shows an example of how the 3D virtual map of FIG. 3 might appear to the user of an AR-enabled HMD device after application of the technique in FIG. 5. The object 120, as displayed to the user, is superimposed over the user's real-world environment (which includes real/physical objects such as a table, a chair, a door, etc.), such that the object 120 displayed within the field of view 130 of the HMD device appears to be part of the user's real-world environment.

Figure 6:
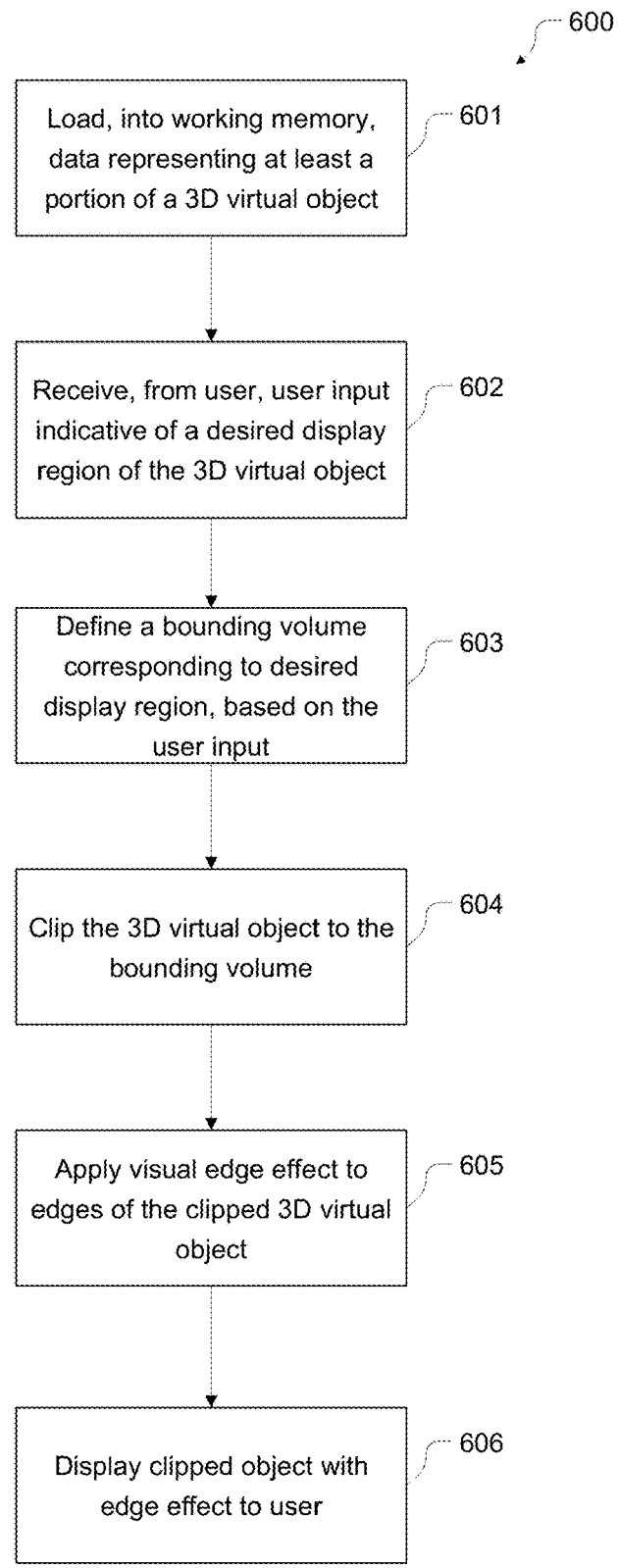
FIG. 6 is a flow diagram showing a more detailed example of a process that a display system can perform to clip a 3D virtual object and apply edge effects according to the technique introduced here.

FIG. 6 shows a more detailed example of a process 600 that a display system (e.g., an HMD device) can perform to clip a 3D virtual object and apply edge effects according to the technique introduced here. Initially, at step 601 the display system loads, into working memory, data representing at least a portion of the 3D virtual object. Next, at step 602 the display system receives, from the user, user input indicative of a desired display region of the 3D virtual object. The user input may be in the form of, for example, a change in the user's location (i.e., point of view), a head movement, a change in gaze direction, a hand gesture, a spoken command (e.g., "zoom in"), or a combination of such inputs.

Figure 8:
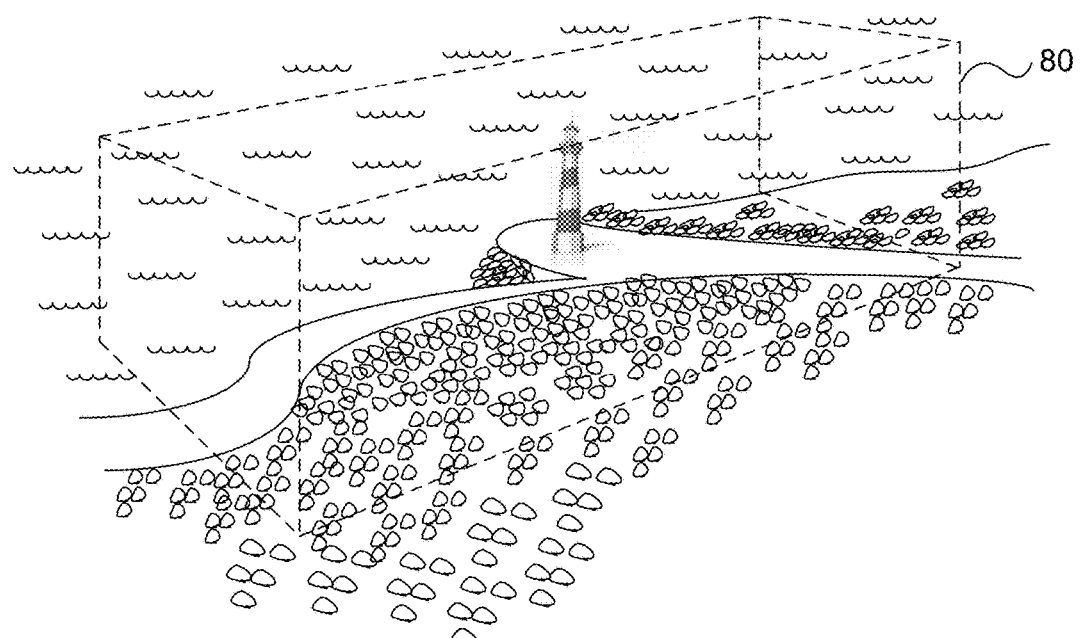
FIG. 8 shows an example of a bounding volume in relation to an image of an object.

At step 603 the display system defines a bounding volume corresponding to user-specified desired display region, based on the user input. The bounding volume may be, for example, a virtual cube or other type of virtual rectangular box, whose boundaries in a horizontal plane may coincide with the boundaries of a tile that contains the desired display region. FIG. 8 shows an example of such a bounding volume, i.e. a bounding box 80, in relation to the image. Note, however, that the bounding volume is not displayed to the user.

In some embodiments, step 603 (defining the bounding volume) is performed by a central processing unit (CPU) of the display system, whereas the subsequent steps (604 through 606) are performed by a GPU of the display system. One reason this may be advantageous is that CPUs tend to be good at executing complex but sequential algorithms (or algorithms with a very low degree of parallelism), whereas GPUs generally can run thousands of jobs in parallel. Also, on GPUs the code tends to be stateless (repeated every frame), whereas on a CPU one can define a state that will remain true for a long time. Thus, one can define the bounding volume first with the CPU and retain it, but "paint" the pixels at every frame on the GPU. In other embodiments, however, all of the steps could be performed on a CPU.

Figure 9:
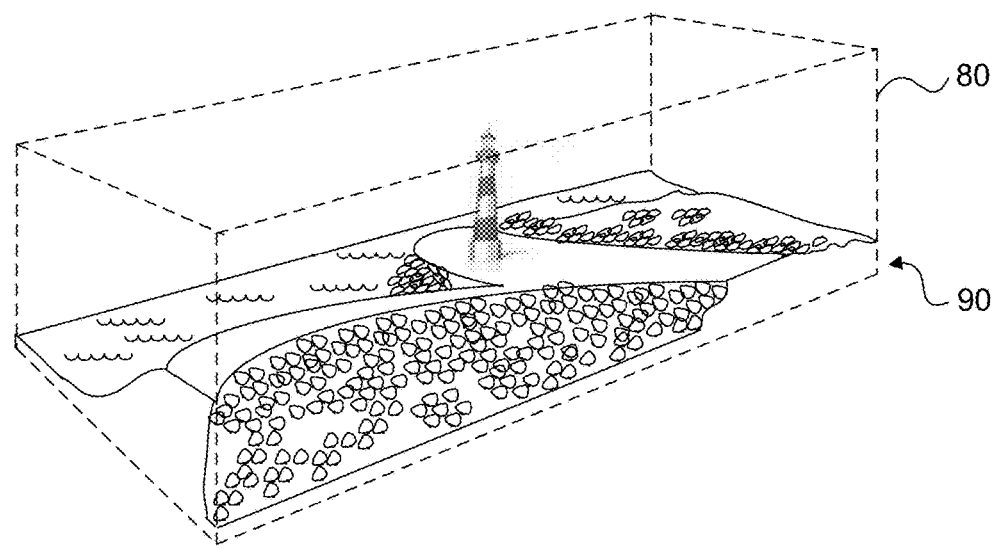
FIG. 9 shows an example of the 3D image of an object after being clipped to the bounding volume.
Figure 10:
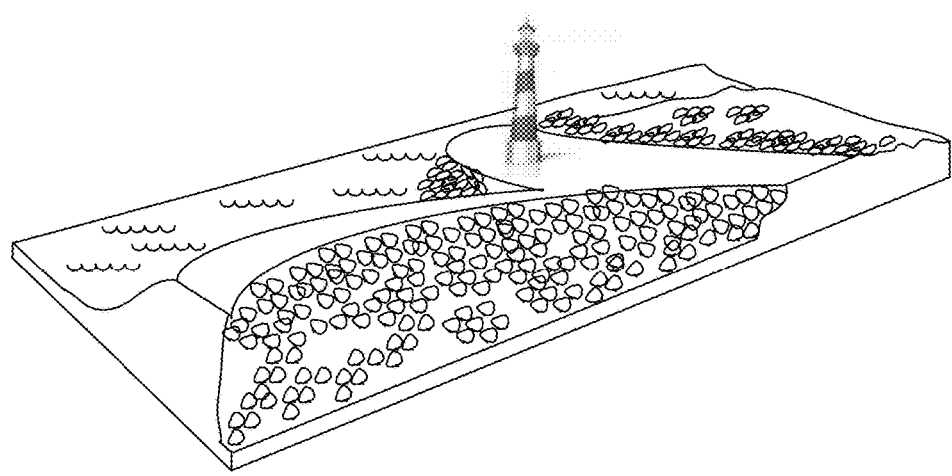
FIG. 10 shows another example of the 3D image of an object after being clipped to the bounding volume.
Figure 11:
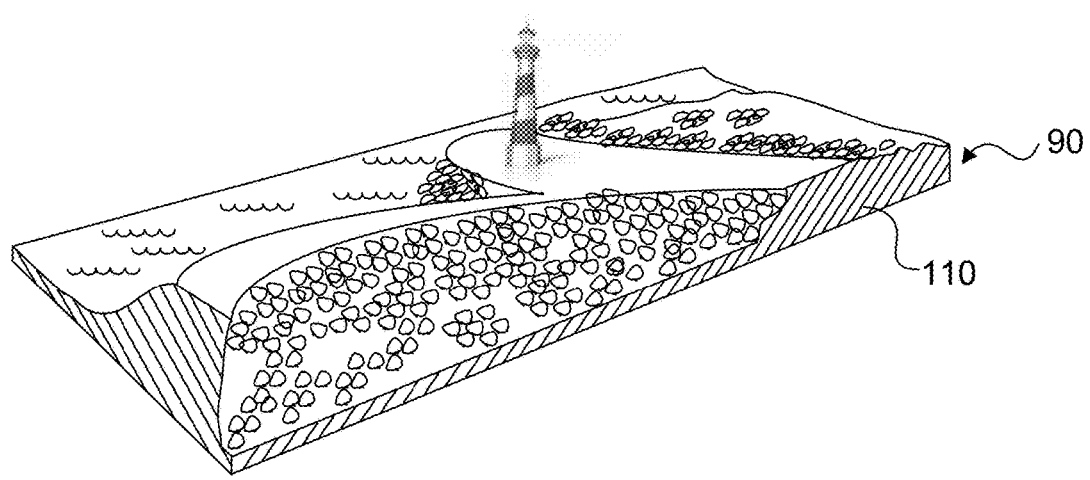
FIG. 11 shows an example of the 3D image of an object after application of an edge effect to the object's clipped surfaces.

Next, at step 604 the display system clips the 3D virtual object to the surfaces of the bounding volume. The clipping may be done to any one or more (or all) of the vertical edges of the bounding box. An example of the result of this step is shown in FIGS. 9 and 10. At step 605 the display system applies one or more visual edge effects to one or more edges 90 of the clipped 3D virtual object (e.g., at least those edges that are to be presently visible to the user from the user's current point of view). An example of the edge effect is shown as edge effect 110 in FIG. 11. The edge effect can be a surface texture or pattern (e.g., cross-hatch as shown), for example. The display system then displays the clipped object with the edge effect to user at step 606, as shown by the example of FIG. 12. The method can repeat from step 601 or step 602 as necessary to reflect changes in the user's desired display region of the object, e.g., a change in point of view, zoom level and/or panning input.

Figure 7:
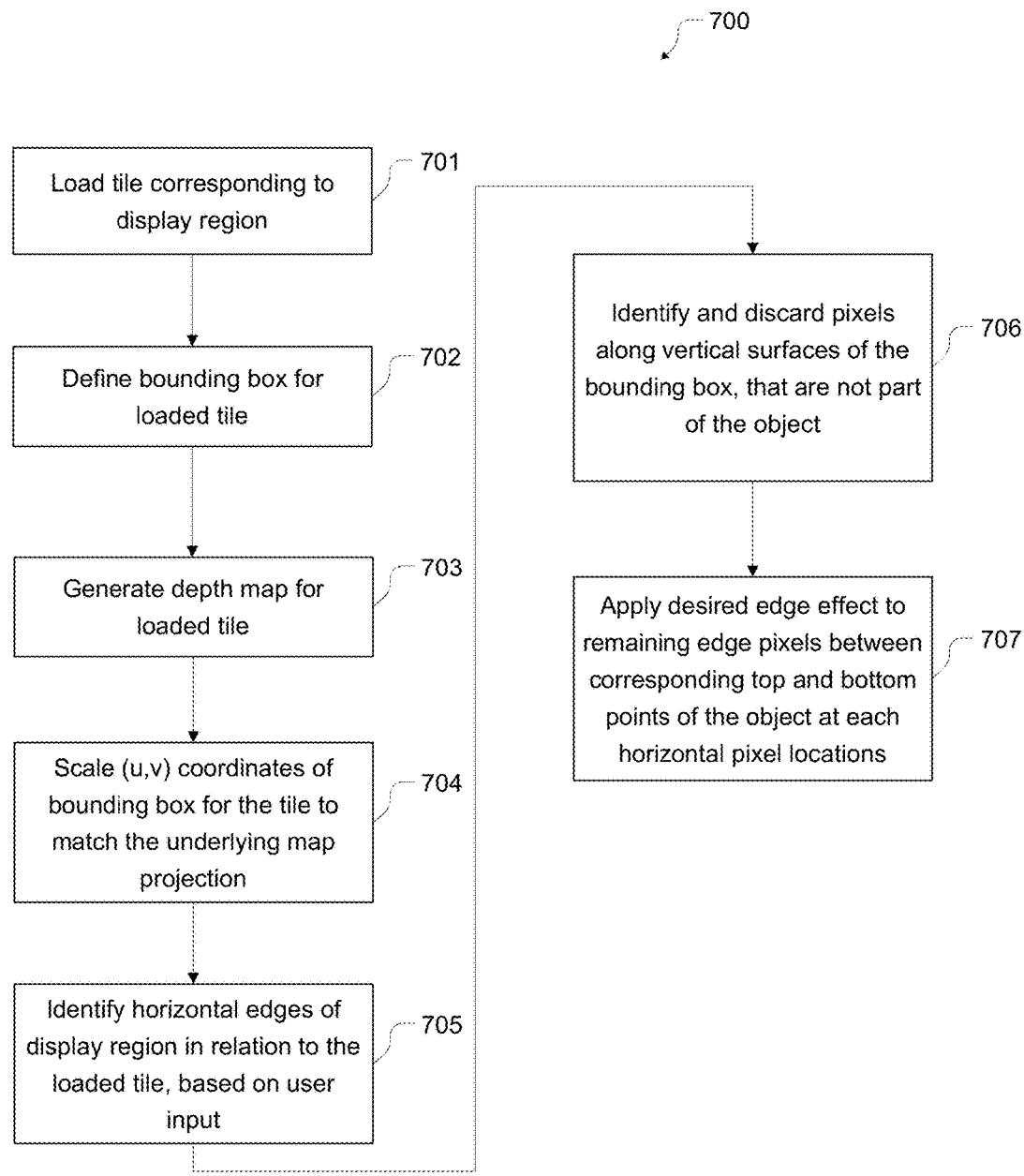
FIG. 7 is a flow diagram showing a more detailed example of a process of applying edge effects according to the technique introduced here.

FIG. 7 illustrates a more detailed example of a process of applying edge effects according to the technique introduced here. At step 701 the display system loads the tile that contains the display region. Next, the display system defines a bounding box for loaded tile at step 702, as described above. The display system then generates a depth map for the loaded tile at step 703. A depth map in this context comprises multiple depth values stored in a memory, where each depth value represents the height of the object at a different one of multiple horizontal pixel locations in the tile. Since tiles are commonly implemented as a triangle mesh with no explicit height information, the depth map can be calculated in certain embodiments by positioning a virtual camera above each of the horizontal pixel locations of the object in the display region, and performing a single-frame render of the display region based on the virtual camera. More specifically, at each horizontal pixel location of the object, the display system calculates the vertical distance from the virtual camera to the topmost pixel of the object, and assigns distance a value in the range of 0 to 1. In certain embodiments a single color channel is used to store these values. Also, as mentioned above, in other embodiments the depth map may instead be generated offline.

Next, at step 704 the display system scales the (u, v) texture coordinates of the bounding box for the tile to match the underlying map projection. The display system then identifies at step 705 the horizontal edges of the display region in relation to the loaded tile, based on user input.

At step 706 the display system identifies pixels along the vertical surfaces of the bounding box, that are not part of the object. In some embodiments this is done by, for each horizontal perimeter pixel coordinate, comparing the projected world coordinate of the bounding box to the stored value in the depth map, and discarding the pixel if the projected world coordinate is greater than the stored depth value; this is done starting from the top of the bounding box and progressing vertically downward to the topmost point of the object, for each horizontal pixel coordinate. Finally, at step 707 the display system applies the desired edge effect to one or more of the vertical surfaces defined by the remaining edge pixels of the object (i.e., at least those edges that are to be presently visible to the user from the user's current point of view).

Figure 13:
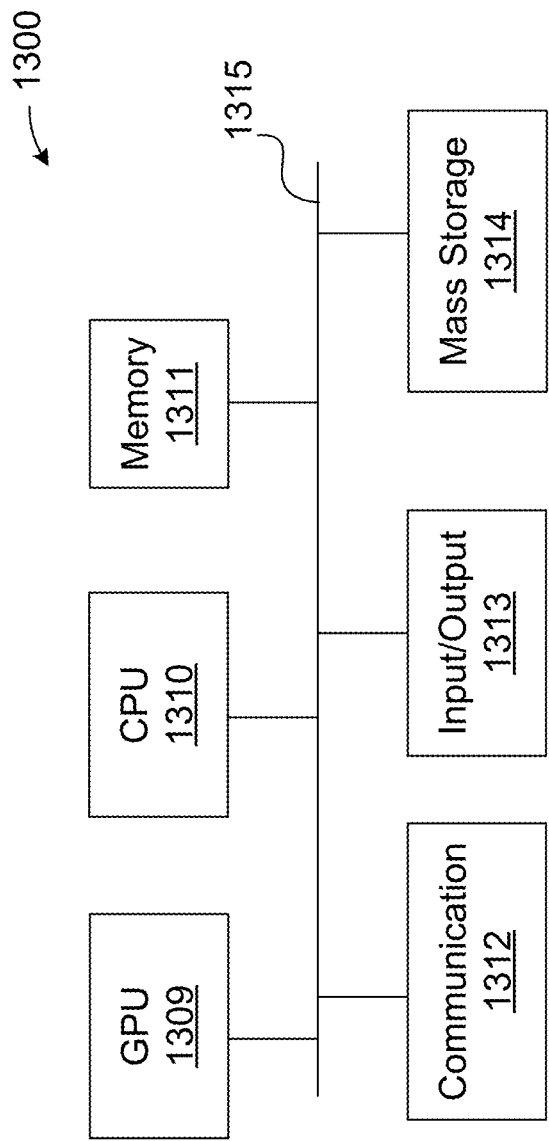
FIG. 13 shows a high-level example of a hardware architecture of a processing system that can be used to implement the disclosed functions.

FIG. 13 shows a high-level example of a hardware architecture of a processing system that can be used to implement the disclosed functions. The processing system 1300 illustrated in FIG. 13 can be, e.g., a subsystem of an HMD device or other system. One or multiple instances of an architecture such as shown in FIG. 13 (e.g., multiple computers) can be used to implement the techniques described herein, where multiple such instances can be coupled to each other via one or more networks.

The illustrated processing system 1300 includes one or more processors, including a GPU 1309, a CPU 1310, one or more memories 1311 (at least a portion of which may be used as working memory, e.g., RAM), one or more communication device(s) 1312, one or more input/output (I/O) devices 1313, and one or more mass storage devices 1314, all coupled to each other through an interconnect 1315. The interconnect 1315 may be or include one or more conductive traces, buses, point-to-point connections, controllers, adapters and/or other conventional connection devices. Each processor 1309 or 1310 controls part of the operation of the processing device 1300 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1311 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 1314 can be or include one or more hard drives, digital versatile disks (DVDs), flash memories, or the like. Each memory 1311 and/or mass storage 1314 can store (individually or collectively) data and instructions that configure the processor(s) 1310 to execute operations to implement the techniques described above. Each communication device 1312 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1300, each I/O device 1313 can be or include a device such as a display (which may include a transparent AR display surface), audio speaker, keyboard, mouse or other pointing device, microphone, camera, etc. Note, however, that such I/O devices may be unnecessary if the processing device 1300 is embodied solely as a server computer.

In the case of a user device, a communication device 1312 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 1312 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A method comprising: loading, into a working memory of a display system configured for stereoscopic 3D display, data representing at least a portion of a 3D virtual object; receiving, from a user, first user input indicative of a desired display region of the 3D virtual object; defining, by the display system, a bounding volume corresponding to the desired display region, based on the first user input; clipping an edge of the 3D virtual object to a surface of the bounding volume; applying a visual edge effect to a clipped edge of the 3D virtual object; and causing display to the user of the 3D virtual object with the visual edge effect.

2. A method as recited in example 1, wherein said clipping comprises selectively discarding pixels along a surface of the bounding volume, based on a depth map indicative of height values of the 3D virtual object at different horizontal pixel locations; wherein applying the visual edge effect comprises applying the visual edge effect only for edge pixels not discarded by said discarding.

3. A method as recited in example 1 or example 2, wherein the 3D virtual object is formed of a plurality of tiles stored in a second memory, the method further comprising: generating the depth map for a particular tile of the plurality of tiles only when the particular tile is initially loaded from the second memory into the working memory; and reusing the depth map when the particular tile is subsequently reloaded into the working memory.

4. A method as recited in any of examples 1 to 3, further comprising: generating the depth map by generating a plurality of depth values, each depth value representing the height of the 3D virtual object at a different one of a plurality of horizontal pixel locations, wherein generating the plurality of depth values includes: positioning a virtual camera above each of the horizontal pixel locations of the 3D virtual object; and performing a single-frame render based on the virtual camera, by calculating, at each horizontal pixel location of the object, a vertical distance from the virtual camera to the topmost pixel of the 3D virtual object.

5. A method as recited in any of examples 1 to 4, wherein said method is performed by a near-eye display (NED) device configured for augmented reality display, the NED device comprises a central processing unit (CPU) and a graphics processing unit (GPU), and said defining the bounding volume is performed by the CPU and all other steps of the method are performed by the GPU.

6. A method as recited in any of examples 1 to 5, without said method is performed without use of a geometry shader.

7. A method as recited in any of examples 1 to 6, further comprising: receiving second user input specifying a new desired display region of the 3D virtual object in a horizontal dimension; and dynamically modifying display of the 3D virtual object with the visual edge effect according to the second user input.

8. A method as recited in any of examples 1 to 7, wherein the 3D virtual object is a 3D terrain image of a geographic area.

9. A method comprising: loading, into a working memory of a near-eye display (NED) device configured for augmented reality display, data corresponding to a desired display region of a 3D virtual object defined by a plurality of pixels; calculating, by the NED device, a depth map of the 3D virtual object, the depth map including a plurality of depth values, each depth value representing a height of the 3D virtual object at a different one of a plurality of horizontal pixel locations of the 3D virtual object; selectively discarding, by the NED device, pixels located at edges of the desired display region of the 3D virtual object, based on the depth map; applying, by the NED device, an edge texture to a subset of pixels of the 3D virtual object that were not discarded by said selectively discarding, each pixel in the subset being located proximate to at least one edge of the selected display portion of the 3D virtual object; and displaying, by the NED device to a user, the 3D virtual object with the edge texture applied to the 3D virtual object.

10. A method as recited in example 9, further comprising: prior to said selectively discarding pixels, defining a bounding volume corresponding to the desired display region, based on first user input; wherein said selectively discarding pixels comprises selectively discarding pixels along a surface of the bounding volume starting from a top of the bounding volume to a topmost pixel of the 3D virtual object, according to the depth map.

11. A method as recited in example 9 or example 10, wherein the bounding volume is a rectangular box.

12. A method as recited in any of examples 9 to 11, wherein the 3D virtual object is a 3D terrain image of a geographic area.

13. A method as recited in any of examples 9 to 12, further comprising generating the depth map by: positioning a virtual camera above each of the horizontal pixel locations of the 3D virtual object; and performing a single-frame render based on the virtual camera, by calculating, at each horizontal pixel location of the object, a vertical distance from the virtual camera to the topmost pixel of the 3D virtual object.

14. A method as recited in any of examples 9 to 13, wherein the NED device comprises a central processing unit (CPU) and a graphics processing unit (GPU), and wherein said defining the bounding volume is performed by the CPU and all other steps of the method are performed by the GPU.

15. A method as recited in any of examples 9 to 14 without said method is performed without use of a geometry shader.

16. A method as recited in any of examples 9 to 15, further comprising: receiving user input specifying a new desired display region of the 3D virtual object in a horizontal dimension; and dynamically modifying display of the 3D virtual object with the visual edge effect according to the second user input.

17. A near-eye display (NED) device configured for augmented reality display, the NED system comprising: a display subsystem including a transparent display surface configured for augmented reality display; a working memory; and a plurality of processors collectively configured to perform steps including loading, into the working memory, data representing at least a portion of a 3D virtual object, at least a portion of which is to be displayed to a user of the NED subsystem; calculating a depth map of the 3D virtual object, the depth map including a plurality of depth values, each depth value representing a height of the object at a different one of a plurality of horizontal pixel locations of the 3D virtual object; selectively discarding pixels located at edges of a selected display portion of the 3D virtual object, based on the depth map; applying an edge effect to a subset of pixels of the 3D virtual object that were not discarded by said selectively discarding, each pixel in the subset being located proximate to at least one edge of the selected display portion of the 3D virtual object; and causing the display surface to display the 3D virtual object with the edge effect applied to the 3D virtual object.

18. An NED device as recited in example 17, wherein the plurality of processors comprise a central processing unit (CPU) and a graphics processing unit (GPU), and wherein said defining the bounding volume is performed by the CPU and all other steps of the method are performed by the GPU.

19. An NED device as recited in example 17 or example 18, wherein at least one of the processors is configured to perform: prior to said selectively discarding pixels, defining a bounding volume corresponding to the desired display region, based on first user input; wherein said selectively discarding pixels comprises selectively discarding pixels along a surface of the bounding volume, starting from a top of the bounding volume to a topmost pixel of the 3D virtual object, according to the depth map.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:
1. A method comprising:
loading, into a working memory of a near-eye display (NED) device configured for augmented reality display, data corresponding to a desired display region of a 3D virtual object defined by a plurality of pixels;
defining, by a central processing unit (CPU) of the NED device, a bounding volume corresponding to the desired display region;
calculating, by the NED device, a depth map of the 3D virtual object, the depth map including a plurality of depth values, each depth value representing a height of the 3D virtual object at a different one of a plurality of horizontal pixel locations of the 3D virtual object;
selectively discarding, by a graphics processing unit (GPU) of the NED device, pixels of the bounding volume that are located at edges of the desired display region of the 3D virtual object, based on the depth map;
applying, by the GPU of the NED device, an edge texture to a subset of pixels of the 3D virtual object that were not discarded by said selectively discarding, each pixel in the subset being located proximate to at least one edge of the selected display portion of the 3D virtual object; and displaying, by the NED device to a user, the 3D virtual object with the edge texture applied to the 3D virtual object.

2. A method as recited in claim 1, wherein
defining the bounding volume is based on first user input;
wherein said selectively discarding pixels comprises selectively discarding pixels along a surface of the bounding volume starting from a top of the bounding volume to a topmost pixel of the 3D virtual object, according to the depth map.

3. A method as recited in claim 1, wherein the bounding volume is a rectangular box.

4. A method as recited in claim 1, wherein the 3D virtual object is a 3D terrain image of a geographic area.

5. A method as recited in claim 1, further comprising generating the depth map by:
positioning a virtual camera above each of the horizontal pixel locations of the 3D virtual object; and
performing a single-frame render based on the virtual camera, by calculating, at each horizontal pixel location of the object, a vertical distance from the virtual camera to the topmost pixel of the 3D virtual object.

6. A method as recited in claim 1, wherein calculating the depth map is performed by the GPU.

7. A method as recited in claim 1, wherein said method is performed without use of a geometry shader.

8. A method as recited in claim 1, further comprising:
receiving user input specifying a new desired display region of the 3D virtual object in a horizontal dimension; and
dynamically modifying display of the 3D virtual object with the visual edge effect according to the second user input.

9. The method of claim 1, wherein selectively discarding the pixels includes, for each horizontal pixel location in the bounding box, comparing a projected world coordinate of the bounding box to a stored value in the depth map, and discarding the pixel if the projected world coordinate is greater than the stored depth value, wherein selectively discarding the pixels is performed, for each horizontal pixel location in the bounding box, starting from one end of the bounding box and progressing vertically to a topmost point of the 3D virtual object.

10. The method of claim 1, further comprising:
scaling texture coordinates of the bounding box to match an underlying map projection;
identifying, based on the scaled texture coordinates, horizontal edges of the desired display region; and
determining the horizontal pixel locations based at least in part on identifying the horizontal edges.

11. The method of claim 10, further comprising, for each horizontal pixel location, calculating a vertical distance from the topmost pixel of the 3D virtual object, and storing the vertical distance in a single color channel as the stored depth value.

12. A near-eye display (NED) device configured for augmented reality display, the NED system comprising:
a display subsystem including a transparent display surface configured for augmented reality display;
a working memory; and
a plurality of processors, including a central processing unit (CPU) and a graphics processing unit (GPU), collectively configured to perform steps including
loading, into the working memory, data representing at least a portion of a 3D virtual object, at least a portion of which is to be displayed to a user of the NED subsystem;
defining, by a central processing unit (CPU) of the NED device, a bounding volume corresponding to the desired display region;
calculating a depth map of the 3D virtual object, the depth map including a plurality of depth values, each depth value representing a height of the object at a different one of a plurality of horizontal pixel locations of the 3D virtual object;
selectively discarding, by the GPU, pixels of the bounding volume that are located at edges of a selected display portion of the 3D virtual object, based on the depth map;
applying, by the GPU, an edge effect to a subset of pixels of the 3D virtual object that were not discarded by said selectively discarding, each pixel in the subset being located proximate to at least one edge of the selected display portion of the 3D virtual object; and
causing the display surface to display the 3D virtual object with the edge effect applied to the 3D virtual object.

13. An NED device as recited in claim 12, calculating the depth map is performed by the GPU.

14. An NED device as recited in claim 12, wherein
defining the bounding volume is based on first user input;
wherein said selectively discarding pixels comprises selectively discarding pixels along a surface of the bounding volume, starting from a top of the bounding volume to a topmost pixel of the 3D virtual object, according to the depth map.

15. The NED device of claim 12, wherein selectively discarding the pixels includes, for each horizontal pixel location in the bounding box, comparing a projected world coordinate of the bounding box to a stored value in the depth map, and discarding the pixel if the projected world coordinate is greater than the stored depth value, wherein selectively discarding the pixels is performed, for each horizontal pixel location in the bounding box, starting from one end of the bounding box and progressing vertically to a topmost point of the 3D virtual object.

16. The NED device of claim 12, wherein the plurality of processors are further collectively configured to perform steps including:
scaling texture coordinates of the bounding box to match an underlying map projection;
identifying, based on the scaled texture coordinates, horizontal edges of the desired display region; and
determining the horizontal pixel locations based at least in part on identifying the horizontal edges.

17. The method of claim 16, wherein the plurality of processors are further collectively configured to perform steps including, for each horizontal pixel location, calculating a vertical distance from the topmost pixel of the 3D virtual object, and storing the vertical distance in a single color channel as the stored depth value.

* * * * *